(12) United States Patent
Leung

(10) Patent No.: US 9,199,571 B2
(45) Date of Patent: Dec. 1, 2015

(54) ADJUSTABLE FLEXIBLE CARGO STRAP

(75) Inventor: Tony K. W. Leung, Hong Kong (HK)

(73) Assignee: Cequent Consumer Products, Inc., Solon, OH (US)

(*) Notice: Subject to any disclaimer, the term of this patent is extended or adjusted under 35 U.S.C. 154(b) by 347 days.

(21) Appl. No.: 13/540,919

(22) Filed: Jul. 3, 2012

(65) Prior Publication Data

US 2014/0007389 A1 Jan. 9, 2014

(51) Int. Cl.
| | |
|---|---|
| *F16G 11/10* | (2006.01) |
| *B60P 7/00* | (2006.01) |
| *B60P 7/08* | (2006.01) |
| *F16G 11/14* | (2006.01) |

(52) U.S. Cl.
CPC .............. *B60P 7/0823* (2013.01); *F16G 11/106* (2013.01); *F16G 11/143* (2013.01); *Y10T 24/2175* (2015.01); *Y10T 24/316* (2015.01); *Y10T 24/3484* (2015.01); *Y10T 24/3499* (2015.01); *Y10T 24/4755* (2015.01)

(58) Field of Classification Search
CPC ......... B60P 7/00; B65D 63/16; F16G 11/106; F16G 11/143; Y10T 24/3484; Y10T 24/2175; Y10T 24/4755; Y10T 24/3499; Y10T 24/316
USPC ........... 24/300, 265 H, 68 CD, 369, 170, 171, 24/181, 194, 195
See application file for complete search history.

(56) References Cited

U.S. PATENT DOCUMENTS

| | | | |
|---|---|---|---|
| 3,678,542 A * | 7/1972 | Prete, Jr. .......................... 24/170 |
| 4,567,628 A * | 2/1986 | Prete et al. ....................... 24/170 |
| 4,878,270 A * | 11/1989 | Westerkamp ................. 24/132 R |
| 5,271,127 A * | 12/1993 | Christensen .................. 24/16 R |
| 5,283,930 A | 2/1994 | Krauss |
| 5,351,367 A | 10/1994 | Kennedy et al. |
| 5,431,365 A * | 7/1995 | Hopkins ......................... 24/170 |
| 5,669,119 A | 9/1997 | Seron |
| 5,987,707 A | 11/1999 | DeShon |
| 6,049,950 A | 4/2000 | Cavallo |
| 6,094,784 A | 8/2000 | Schrader |
| 6,279,205 B1 | 8/2001 | Steiner |
| 6,292,984 B1 | 9/2001 | Nelson |
| 6,308,383 B1 | 10/2001 | Schrader |
| 6,385,822 B1 * | 5/2002 | Dean et al. .................... 24/572.1 |
| 6,526,629 B1 * | 3/2003 | Warner et al. ................... 24/170 |
| D480,946 S | 10/2003 | Estep, Jr. |
| 6,802,109 B2 | 10/2004 | Hede et al. |
| 6,817,068 B2 | 11/2004 | Cleary et al. |
| 6,851,163 B2 | 2/2005 | Selby |
| 6,877,189 B2 * | 4/2005 | Simonson et al. .............. 24/170 |
| 7,219,398 B1 | 5/2007 | Hunt et al. |
| 7,228,600 B1 | 6/2007 | Selby et al. |
| D550,543 S | 9/2007 | Selby |
| 7,287,303 B2 | 10/2007 | Yang |
| 7,404,239 B1 * | 7/2008 | Walton et al. ................... 24/170 |
| 7,568,600 B2 | 8/2009 | Godshaw et al. |

(Continued)

*Primary Examiner* — Robert J Sandy
(74) *Attorney, Agent, or Firm* — McDonald Hopkins LLC

(57) ABSTRACT

A cargo securing device is shown and described herein. The cargo securing device may include a strap, and a body member having an opening, the strap positioned in the opening. The cargo securing device may also include a securing mechanism located in the body member, where the strap is moveable in a first direction free from engagement with the securing mechanism and where the strap is moveable in a second direction engaging the securing mechanism generally securing the strap within the body member and fixing an operative length of the strap.

28 Claims, 4 Drawing Sheets

(56) References Cited

U.S. PATENT DOCUMENTS

| | | |
|---|---|---|
| 7,575,224 B1 | 8/2009 | Madland |
| 2001/0054219 A1* | 12/2001 | Settelmayer et al. ........... 24/170 |
| 2005/0223528 A1 | 10/2005 | Bauer |
| 2006/0037178 A1 | 2/2006 | Sulhoff |
| 2006/0085956 A1 | 4/2006 | Stevens |
| 2007/0151083 A1 | 7/2007 | Peet |
| 2009/0223024 A1 | 9/2009 | Bauer |
| 2010/0200604 A1 | 8/2010 | Sharma et al. |
| 2011/0005041 A1 | 1/2011 | Gangakhedkar et al. |
| 2011/0211930 A1 | 9/2011 | Digman |
| 2011/0225779 A1 | 9/2011 | Jones |
| 2011/0252604 A1 | 10/2011 | Hansen |
| 2012/0180267 A1* | 7/2012 | LeBeau ....................... 24/134 R |
| 2012/0311824 A1* | 12/2012 | Mulholland et al. ............ 24/301 |

* cited by examiner

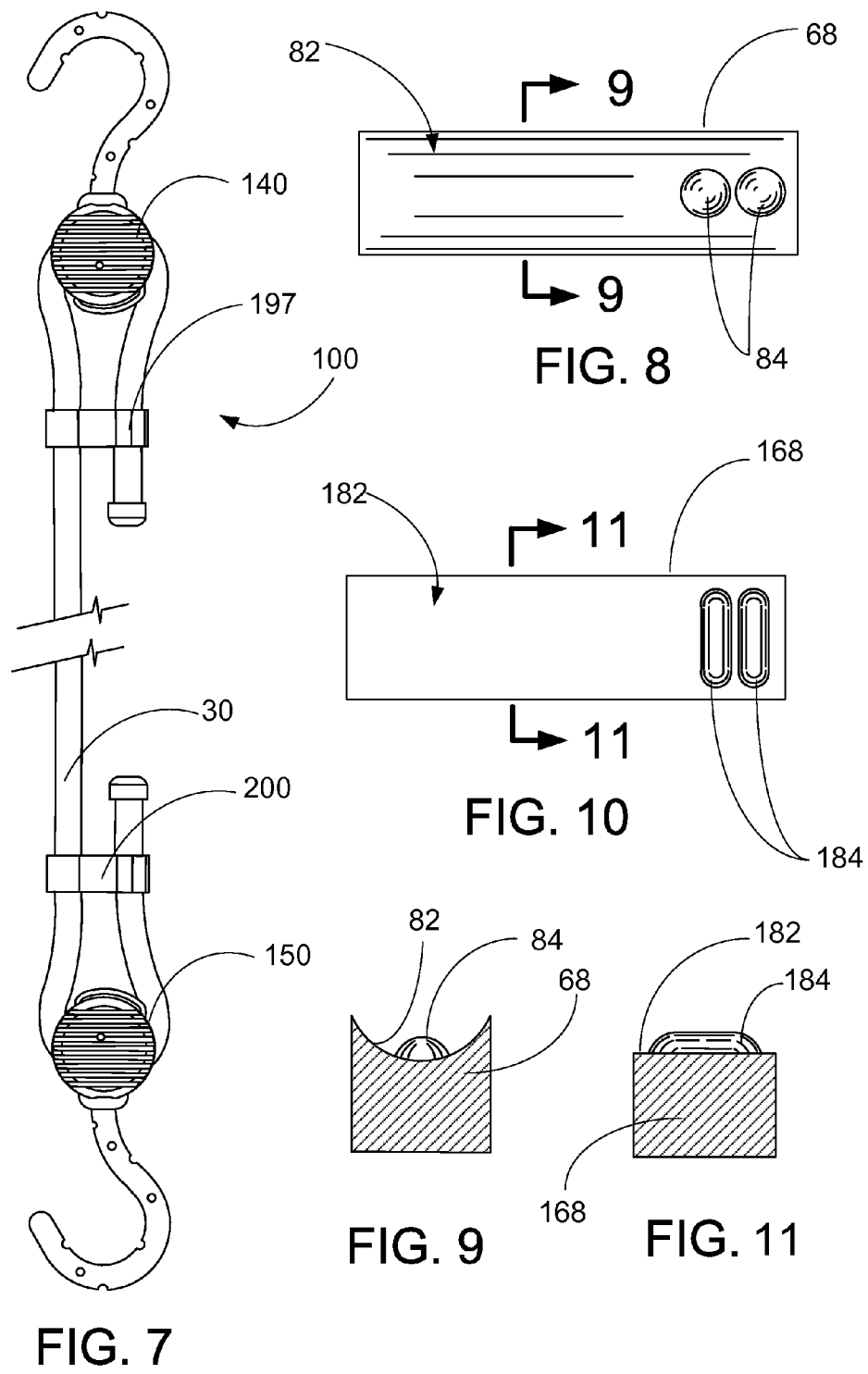

ADJUSTABLE FLEXIBLE CARGO STRAP

FIELD OF THE INVENTION

The present invention is generally related to a cargo securing device and, more particularly, to an adjustable length cargo securing device.

BACKGROUND

Various types of cargo securing devices are used to secure an object/cargo with respect to a fixed reference point. Such devices may generally be attached at one end to the object/cargo to be secured and at an opposite end to the fixed reference point. Alternatively, these devices may be attached at two fixed reference points contacting and generally containing an object or cargo therebetween. In some situations, one or more cargo securing devices may be attached together. Still further in some situations, cargo securing devices are used to attach two items together or are used to generally wrap around a single item. Such cargo securing devices are capable of a wide variety of uses.

Traditional cargo securing devices often utilize a strap or cord, such as a rope or a vinyl band, to hold the object and hooks at the ends thereof to fix to the reference point or object. Elastic or stretchable straps/cords may also be used to provide flexibility in the length of the cargo securing device. These elastic or stretchable straps/cords, often referred to as bungee cords, have tremendous utility. Bungee cords are particularly useful to maintain cargo during transportation of the cargo. A typical bungee cord may include one or more elastic strands that form a core. The core is often covered with a woven nylon or cotton sheath, although some bungee cords may be made entirely of elastic strands.

Although bungee cords are known to be highly elastic (varying with the type of material used), the minimum length is fixed and the maximum length to which bungee cords can be stretched is limited by the elasticity of the bungee cords' material. Many times it is desirable to have variable length cords without cutting the cord to a shorter length or obtaining various lengths of separate cords. Therefore, these bungee cords cannot be adjusted to, on one occasion, mount or secure an object or objects of a first size and shape, then, on another occasion, mount or secure different objects having a much larger or much smaller size. In the past, multiple cords needed to be "linked" together to accomplish this, and/or many cords having a variety of lengths were needed in order to meet these ever changing length requirements.

One very simple solution would be to tie one or more a knots in the cord along its length. This has the disadvantage of having to untie these knots afterwards which may not be an easy affair if the cord had been subjected to considerable tension with the knots tightened on it. Another disadvantage of using knots is that the cord is acting against itself when tensioned thereby subjecting the cord to a certain amount of destructive force.

Various types of adjustable bungee cords have been developed. Many of these adjustable bungee cords, however, suffer from design deficiencies. For example, many adjustable bungee cords include complex components and complicated moving pieces. These complex designs may increase the overall cost and further complicate the process of adjusting and tightening the bungee cords and may also limit the durability. Other adjustable cord designs often fail to properly secure the strap or cord at the desired location, thus allowing the strap or cord to loosen or become detached.

Therefore, it may be desirable to provide an adjustable cargo securing device, such as an adjustable bungee cord that may have a selectively adjustable operative length. Such an adjustable cargo securing device may permit a wider range of functionality, as well as reduce the quantity of bungee cords needed for common applications, such as the transportation of goods/cargo.

SUMMARY

A cargo securing device may include a strap, and a body member having an opening, the strap positioned in the opening. The cargo securing device may also include a securing mechanism located in the body member, where the strap is moveable in a first direction free from engagement with the securing mechanism and where the strap is moveable in a second direction engaging the securing mechanism generally securing the strap within the body member and fixing an operative length of the strap.

A cargo securing device may include a cord having first and second ends, and a hook member having a body, the body having an aperture where the cord is positionable within the aperture. The cargo securing device may also include an engagement member located in the body, where the cord is moveable within the aperture in a locking direction whereby the cord operatively engages the engagement member securing the cord within the body and fixing an operative length of the cord.

A cargo securing device may include a generally flexible strap having first and second end portions, a body having an aperture positioned therein, the first end portion of the strap positioned in the aperture, and a hook end attached to the body. The cargo securing device may also include a locking member positioned in the body in operative communication with the aperture, where the strap is capable of being positioned in a first direction generally free of engagement with the locking member and where the strap is capable of pivoting the locking member into engagement with the strap generally fixing an operative length of the strap.

BRIEF DESCRIPTION OF THE DRAWINGS

The invention may be better understood by reference to the following detailed description taken in connection with the following illustrations, wherein:

FIG. 7 is a front view of some embodiments of an adjustable cargo securing device.

FIG. 8 is a top view of portions of a cam mechanism of the adjustable cargo securing device of FIG. 3 taken along line 8-8.

FIG. 9 is a cross-sectional view of portions of the cam mechanism of the adjustable cargo securing device of FIG. 8 taken along line 9-9.

FIG. 10 is a top view of embodiments of portions of a cam mechanism of an adjustable cargo securing device.

FIG. 11 is a cross-sectional view of portions of the cam mechanism of the adjustable cargo securing device of FIG. 10 taken along line 11-11.

DETAILED DESCRIPTION

Figures 1, 2:
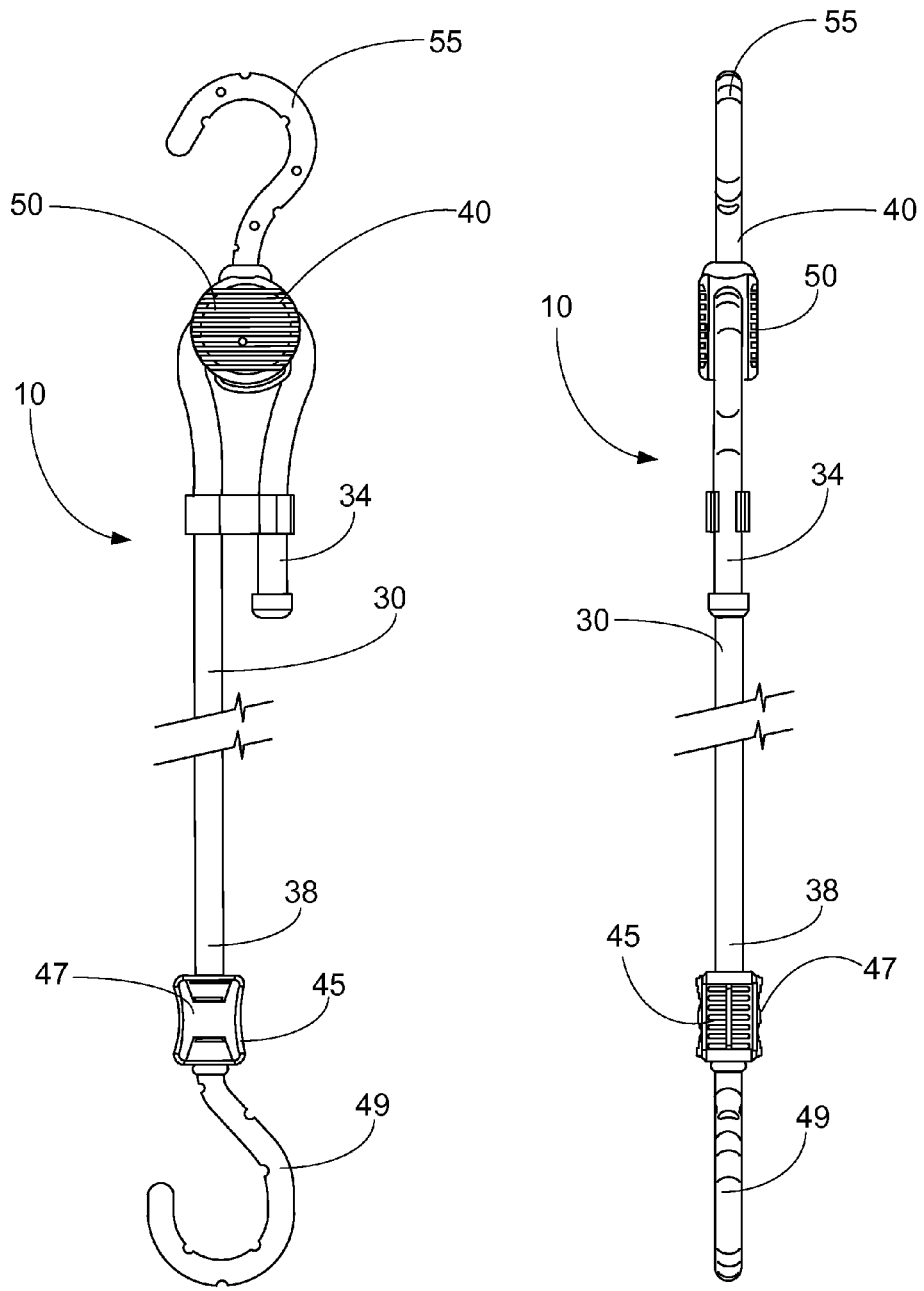
FIG. 1 is a front view of embodiments of an adjustable cargo securing device.
FIG. 2 is a side view of the adjustable cargo securing device.
Figure 3:
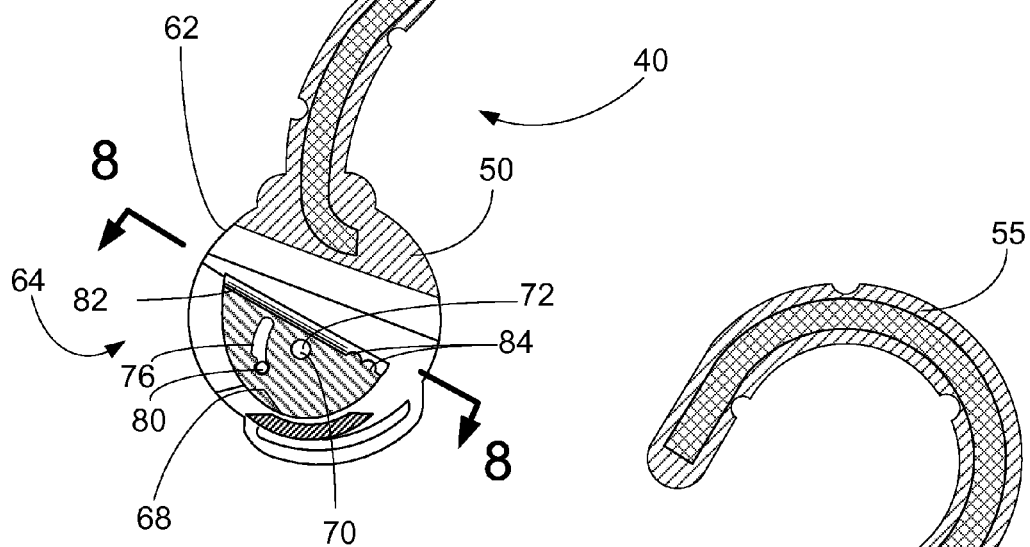
FIG. 3 is a cross-sectional view of portions of the adjustable cargo securing device without a cord.
Figure 4:
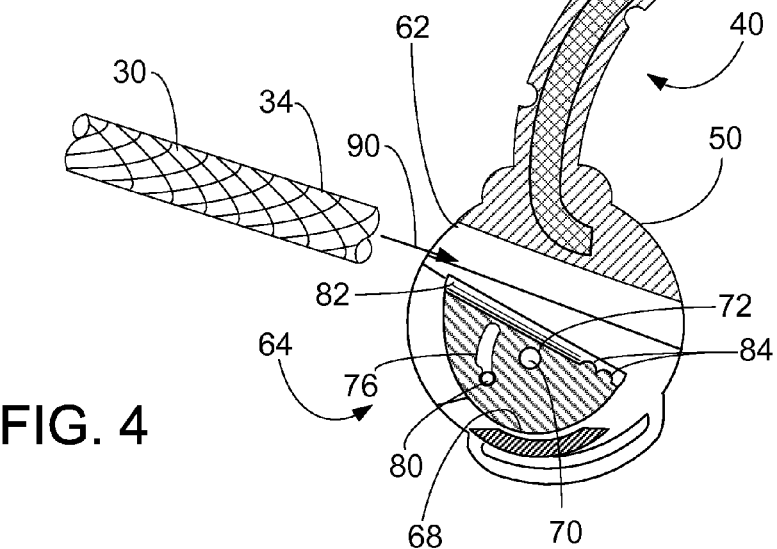
FIG. 4 is a cross-sectional view of portions of the adjustable cargo securing device with the cord being inserted.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

An adjustable cargo securing device 10 is illustrated in FIGS. 1-6. The adjustable cargo securing device 10 may be configured to secure cargo in any appropriate manner. The adjustable cargo securing device 10 may include a generally flexible cord 30. The cord 30 may include a first end 34 and a second end 38. The cord 30 may formed of any appropriate material. In some embodiments, the cord 30 may be elastic and generally stretchable—such as a bungee cord. By way of a non-limiting example, the cord 30 may include one or more elastic strands that form an elastomer rope core that may be covered with a reinforcement layer that may be made of at least one of nylon, cotton, polypropylene, carbon fiber, or other such flexible fabrics or any combination thereof. Alternatively, the cord 30 may be made entirely of elastic strands. Still further, the cord 30 may be made of rubber cord, or any such stretchable material. In some embodiments, the cord 30 may not be stretchable but may comprise a nylon rope, a plastic cord, or may be made of any non-stretchable material. The present teachings are not limited to the specific embodiments of the cord 30 shown and described. The cord 30 may be of any appropriate construction and/or material.

The adjustable cargo securing device 10 may include a first hook 40 and a second hook 45. The second hook 45 may be fixedly secured to the second end 38 of the cord 30 and the first hook 40 may be selectively secured to the cord 30 at any appropriate location between the first end 34 and the second end 38 of the cord 30 as described in more detail below.

The second hook 45 may include a body member 47 and a hook end 49. In some embodiments, the body member 47 may be fixedly secured to the second end 38 of the cord 30 and the hook end 49 may be pivotably secured to the body member 47. Alternatively, the body member 47 may be pivotally secured to the second end 38 of the cord 30 and the hook end 49 may be fixedly secured to the body member 47. Still further, the body member 47 may be fixedly secured to the second end 38 of the cord 30 and the hook end 49 may be fixedly secured to the body member 47.

The body member 47 may be monolithically formed with the hook end 49 or may be attached thereto in any appropriate manner, such as by welding, engaging, fastening, using adhesives or the like. The body member 47 and the hook end 49 may be formed of any appropriate material, such as by way of a non-limiting example, plastic, rubber, metal, or any combination of such. Hook end 49 and body member 47 may be of any appropriate size and shape and are not limited to that shown.

The first hook 40 may include a body member 50 and a hook end 55. Hook end 55 and body member 50 may be of any appropriate size and shape and are not limited to that shown. The body member 50 may be selectively secured at any appropriate location between the first end 34 and the second end 38 of the cord 30, as described in more detail below. The hook end 55 may be pivotably secured to the body member 50. Alternatively, the hook end 55 may be fixedly secured to the body member 50. The body member 50 may be monolithically formed with the hook end 55 or may be attached thereto in any appropriate manner, such as by welding, engaging, fastening, using adhesives or the like. The body member 50 and the hook end 55 may be formed of any appropriate material, such as by way of a non-limiting example, plastic, rubber, metal, or any combination of such.

The body member 50 may include an opening 62 through which the cord 30 is capable of passing. The opening 62 may extend through an entire portion of the body member 50 and may be of any appropriate shape and size such that the cord 30 may be slid into and out of the body member 50 as appropriate. The opening 62 may be integrally formed with the body member 50 or may be added through a subsequent operation.

The body member 50 may include a securing mechanism 64, such as a cam mechanism, that may be appropriately positioned within the body member 50 such that it is capable of engaging and fixedly securing the cord 30 relative to first hook 40 as described in more detail below. The securing mechanism 64 may allow selective adjustment of an operative length of the cord 30, i.e., it may lengthen or shorten the operative length of the cord 30 between first and second hooks 40, 45. The securing mechanism 64 may permit the distance between the first hook 40 and second 45, to be lengthened and/or shortened by pulling on the cord 30 in an appropriate direction. The securing mechanism 64 may be generally positioned within the body member 50 such that the body member 50 may protect the securing mechanism 64 from environmental contaminants. This may generally protect operation of the securing mechanism 64.

Securing mechanism 64 is capable of securing the cord 30 in a fixed position relative to the first hook 40 when the cord 30 is positioned in a predetermined orientation relative to the first hook 40. The securing mechanism 64 is also capable of releasing the cord 30 for movement relative to the first hook 40 when the cord 30 is positioned in a different orientation relative to the first hook 40. This results in an adjustable cargo securing device 10 in which the operative length of cord 30 may be changed based on the orientation of cord 30 relative to first hook 40.

In some embodiments, the securing mechanism 64 may be operatively positioned relative to the opening 62 such that it may be capable of engaging a portion of the cord 30 when the cord is inserted into the opening 62. The securing mechanism 64 may be a cam mechanism, as shown, and may include a cam locking member 68 pivotally secured to the body member 50 at pivot 70 in any appropriate manner. The pivot 70 may include a post 72 integrally formed with the body member 50 or attached thereto such as through fastening, welding, adhering or the combination of such. The cam locking member 68 may pivot at the pivot 70 as described in more detail below. The cam locking member 68 may be of any appropriate shape or size. By way of a non-limiting example, the cam locking member 68 may be a half-circular shaped member as shown in FIGS. 3-6. The cam locking member 68 may be made of any appropriate material, such as by way of a non-limiting example, plastic, rubber, metal, or any combination of such. The cam locking member 68, however, may be of any shape and material and is not limited to that shown and described herein.

The cam locking member 68 may include a slot 76 formed therein. The slot 76 may be of any appropriate shape and size and is not limited to that shown and described. The slot 76 may operatively engage a second post 80 attached or integrally formed with the body member 50. The engagement of the slot 76 with the second post 80 may generally control the degree to which the cam locking member 68 is capable of pivoting with respect to the body member 50. Specifically, the slot 76 may prevent the cam locking member 68 from pivoting relative to the pivot 70 beyond a predetermined amount by having an end portion of the slot 76 engage the post 80 generally preventing further pivoting of the cam locking member 68.

Figures 5, 6:
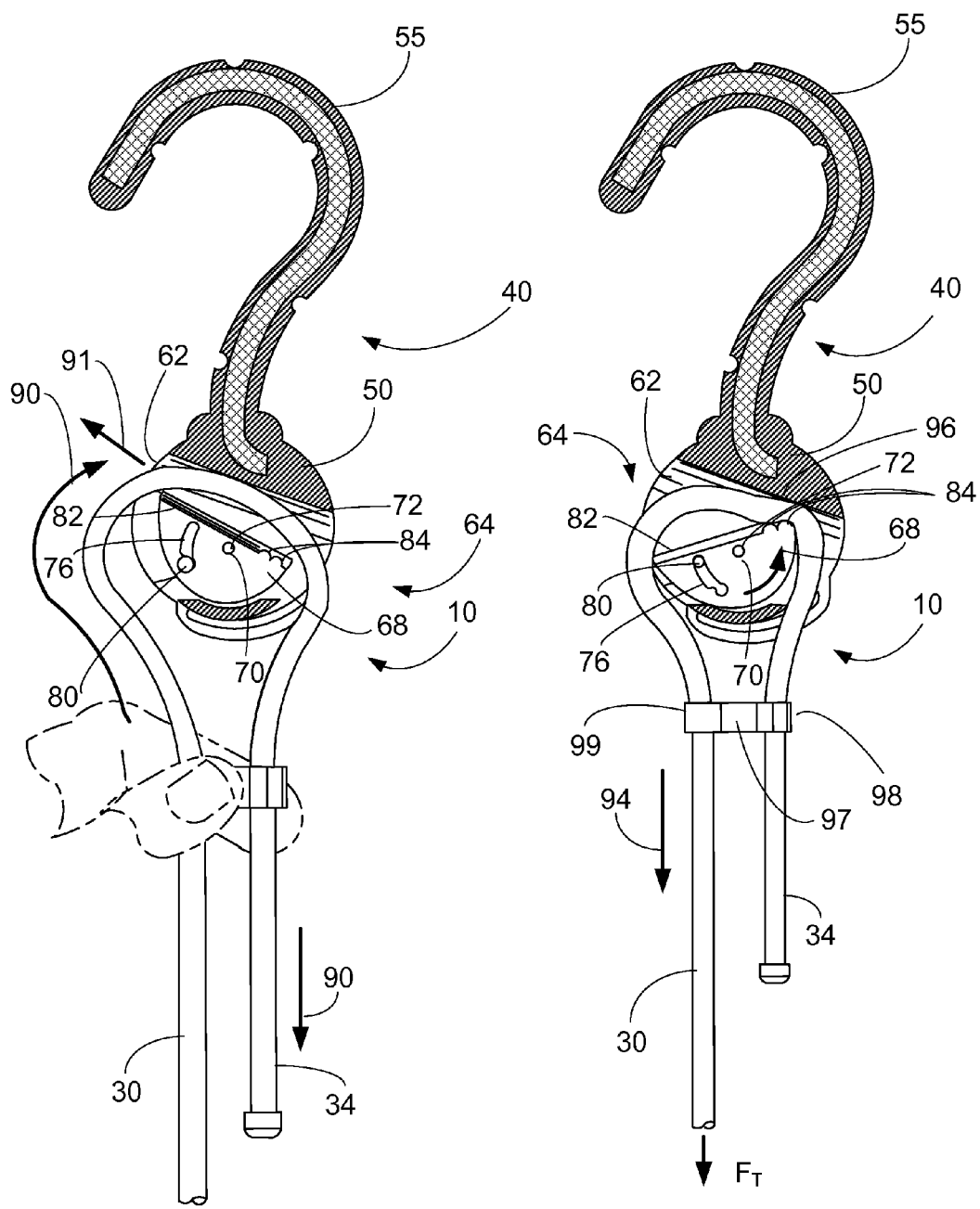
FIG. 5 is a cross-sectional view of portions of the adjustable cargo securing device with the cord inserted and shown being positioned in a first direction and/or third direction.
FIG. 6 is a cross-sectional view of portions of the adjustable cargo securing device with the cord inserted and shown being positioned in a second direction.

The cam locking member 68 may include a cord engaging surface 82 that may include at least one engaging member 84 integrally formed thereon or attached thereto through a subsequent operation. However, any number of engaging members 84 may be used without departing from the present teachings. The engaging member 84 may include at least one protrusion, such as a tooth, knob, barb, ridge or the like positioned on the engaging surface 82 of the cam locking member 68. Exemplary embodiments of the engaging member 84 are shown in FIGS. 8 and 9. In these embodiments, the engaging surface 82 may include two engaging members 84. The engaging members 84 may be of a generally circular shape protrusion and the engaging surface 82 may be generally concave—see FIG. 9. The engaging surface 82 may be of any appropriate shape and is not limited to that shown. The engaging member 84 may be of any appropriate shape and size without departing from the present teachings. By way of a non-limiting example, the engaging member 84 may be a protrusion having a shape of at least one of a generally sinusoidal, rectangular, curved, ridged, peaked, knob, barb, ovoidal, or a combination of such shapes. The engaging member 84 is capable of fixedly engaging the cord 30 when the securing mechanism 64 pivots to a locked position toward the cord 30, such as shown in FIG. 6. The engaging member 84 may selectively secure cord 30 within the opening 62 and prevent increasing of the operative length of cord 30, thereby fixing the operative length of cord 30.

In operation, the cord 30 may be selectively positioned in and moved through the opening 62 in a first direction, generally indicated by reference numeral 90. As the cord 30 moves in the first direction 90, it may be free of engagement with the cam locking member 68. Once the appropriate length of cord 30 has been inserted through the opening 62, i.e., the desired operative length of cord 30 is obtained, the cord 30 may be moved in a second direction, generally indicated by reference numeral 94. As the cord 30 moves in the second direction 94, the cord 30 may engage the cam locking member 68, depending on the particular orientation of the second direction 94. More specifically, the cord 30 may engage engaging surface 82 (such as the portion generally located on a side opposite of pivot 70 from engaging members 84) and cause locking member 68 to pivot about pivot 70 (counter clockwise in the views depicted) and cause engaging members 84 to engage with cord 30 and pinch or wedge cord 30 between engaging members 84 and a portion 96 of the opening 62, as shown in FIG. 6. As the cam locking member 68 pivots about pivot 70, the post 82 may engage the slot 76 of the cam locking member 68, which may generally prevent the cam locking member 68 from pivoting further when the post 80 reaches the end of slot 76; see FIG. 6. In this manner, securing mechanism 64 locks cord 30 within the body member 50 generally preventing the effective length of cord 30 from increasing. Second direction 94 may generally correspond to the same direction of a tension force $F_T$ imparted on cord 30 adjacent second hook 55 when adjustable cargo securing device 10 is stretched and securing an object. This correspondence further operates to maintain cord 30 locked within body member 50 and reduce the chance of the operative length changing during use.

If the operative length of the cord 30 needs to be adjusted, the cord 30 may be moved in first direction 90, which may disengage the cam locking member 68 from the cord 30 generally allowing the cord 30 to move within body member 50. More specifically, the cord 30 moving in the first direction 90 may pivot the cam locking member 68 at the pivot 70 (clockwise in the views depicted). This may then release the cord 30 from the cam locking member 68, or more specifically, releasing the cord 30 from wedged engagement between the engaging members 84 and the portion 96 of the opening 62 of the body member 50. This may generally permit movement of the cord 30. Once the desired operative length of cord 30 has been obtained, the cord 30 may be moved in the second direction 94 locking such as described above.

When it is desired to increase the operative length of cord 30, cord 30 may be moved in a third direction, generally indicated by reference numeral 91, such that first end 34 is moved closer to second hook 55. Specifically, when locking mechanism 68 is oriented in a position wherein engaging members 84 are not engaged with cord 30, such as the orientation shown in FIG. 5 by way of non-limiting example, cord 30 may be moved within body member 50 in the direction generally corresponding to the third direction 91 to move first end 34 closer to second hook 55. It should be appreciated that movement in the third direction 91 may inadvertently cause engaging members 84 to engage with cord 30 and prevent further lengthening of the operative length. In such an event, cord 30 can be moved in the first direction 90 to disengage engaging members 84 from cord 30 and then again moved in the third direction 91 to further lengthen the operative length.

In some embodiments, the cargo securing device 10 may include a clip 97 that may be generally secured to the cord 30. The clip 97 may be capable of being removably secured to any appropriate portion of the cord 30. As shown in FIGS. 5 and 6, one cord engaging member 98 of the clip 97 may engage one portion of the cord 30 and a second cord engaging member 99 of the clip 97 may engage a second portion of the cord 30, such as the portion closer to first end 34. The clip 97 may be made of any appropriate material. Further, the clip 97 may be used to generally prevent the cord 30 from being released from the securing mechanism 64 when engaged therewith, i.e., the clip 97 may generally inhibit the cord 30 from moving in the second direction 94.

Additional embodiments of an adjustable cargo securing device according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired adjustable cargo securing device without departing from the spirit and scope of the present teachings.

In some embodiments, such as shown in FIGS. 10 and 11, an engaging surface 182 of the securing mechanism 64 may include two protruding engaging members 184. The engaging surface 182 may be generally planar—see FIG. 11. More specifically, the engaging surface 182 may include a pair of protruding engagement members 184 of a generally oval shape. However, the engaging members 184 may be of any appropriate shape and size and while shown as being of a similar shape, may be of different shapes without departing from the present teachings.

In some embodiments, such as that shown in FIG. 7, a cargo securing device 100 may include a first hook 140 and a second hook 150 operatively secured with the cord 30. The first and second hooks 140, 150 may both include the securing mechanism 64 as described in more detail above. Utilizing the first and second hooks 140, 150 may permit the cord 30 to be adjusted in length from either end thereof. This may be particularly useful for cords 30 that have a greater length. Further, the cargo securing device 100 may include a first clip 197 and a second clip 200. The first and second clips 197, 200 may generally prevent the cord 30 from inadvertently moving; especially during use of the cargo securing device 100 in holding cargo during transportation thereof. The clips 197, 200 may generally prevent the cord 30 from moving in the second direction 94.

Still further, in some embodiments the securing mechanism 64 may be used in other environments where it is desired to tighten a cable, rope, webbing or the like, such as, e.g., tightening a tent rope, a guy wire, a sailing line and so on. The securing mechanism 64 is not limited to being used with a bungee cord.

It should be appreciated that the exact orientations of the first, second and third directions 90, 94, 91 shown in the figures are merely representative orientations and that the actual orientations may vary from that shown as dictated by the design and arrangements of the securing mechanism 64, cord 30 and the particular hook associated with securing mechanism 64. As such, the operative length of cord 30 and the securing of cord 30 relative to the associated hook may be accomplished by movement differing from that shown and still be within the scope of the present teachings.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A cargo securing device comprising:
    a strap having first and second portions;
    a body member having an opening, the strap positioned in the opening; and
    a securing mechanism located in the body member, wherein the first portion of the strap is moveable in a first direction free from engagement with the securing mechanism and wherein the second portion of the strap is moveable in a second direction engaging the securing mechanism generally securing the strap within the body member and fixing an operative length of the strap.

2. The cargo securing device of claim 1, wherein the strap is an elastic cord.

3. The cargo securing device of claim 1, further comprising a hook secured to the body member, the hook capable of being affixed to an object.

4. The cargo securing device of claim 1, wherein the securing mechanism includes a camming locking member pivotally attached to the body member whereby the strap moving in the second direction pivots the camming locking member into engagement with the strap.

5. The cargo securing device of claim 4, wherein moving the strap in the first direction pivots the camming locking member free from engagement with the strap.

6. The cargo securing device of claim 5, wherein the operative length of the strap is capable of being shortened when the strap is positioned in the first direction.

7. The cargo securing device of claim 4, further comprising at least one engaging member attached to the camming locking member, wherein the engaging member engages the strap upon engagement of the camming locking member with the strap.

8. The cargo securing device of claim 7, wherein the engaging member is at least one protrusion selected from a group consisting of at least one of a tooth, barb, ridge and knob.

9. The cargo securing device of claim 1, wherein the strap is moveable in a third direction whereby the strap is capable of being released from engagement with the securing mechanism and the strap is capable of being lengthened.

10. A cargo securing device comprising:
    a cord having first and second ends;
    a hook member having a body, the body having an aperture wherein the cord is positionable within the aperture; and
    an engagement member located in the body, wherein the first end of the cord is moveable within the aperture in a locking direction whereby the cord operatively engages the engagement member securing the cord within the body and fixing an operative length of the cord;
    wherein the second end of the cord is positionable in an unlocking direction releasing the engagement member from engagement with the cord.

11. The cargo securing device of claim 10, wherein fixing the operative length of the cord generally inhibits further movement of the cord in the locking direction.

12. The cargo securing device of claim 10, wherein the operative length of the cord is capable of being shortened when the cord is positioned in the unlocking direction.

13. The cargo securing device of claim 10, further comprising a clip selectively attached to the cord, the clip generally inhibiting movement of the cord in the unlocking direction.

14. The cargo securing device of claim 10, wherein the cord is positionable in a lengthening direction releasing the engagement member from engagement with the cord whereby the cord is generally positionable in at least the lengthening direction.

15. The cargo securing device of claim 14, wherein the operative length of the cord is capable of being lengthened when the cord is positioned in the lengthening direction.

16. The cargo securing device of claim 10, wherein the engagement member is pivotally attached to the body whereby the cord moving in the locking direction engages the engagement member pivoting the engagement member in to wedging engagement with the cord and the body fixing the operative length of the cord.

17. The cargo securing device of claim 16, wherein moving the cord in the unlocking direction pivots the engagement member free from engagement with the cord whereby the cord is further positionable in at least the unlocking direction and the operative length of the cord is selectively adjustable.

18. The cargo securing device of claim 17, wherein the engagement member includes a slot and the body includes a post whereby the post is capable of engaging the slot generally inhibiting further pivoting of the engagement member in at least one direction.

19. A cargo securing device comprising:
- a generally flexible strap having first and second end portions;
- a body having an aperture positioned therein, the first end portion of the strap positioned through the aperture;
- a hook end attached to the body; and
- a locking member positioned in the body in operative communication with the aperture, wherein the first end portion of the strap is capable of being positioned in a first direction generally free of engagement with the locking member and wherein the second end portion of the strap is capable of pivoting the locking member into engagement with the strap generally fixing an operative length of the strap.

20. The cargo securing device of claim 19, wherein positioning the strap in a second direction pivots the locking member into engagement with the strap fixing a position of the strap relative to the body.

21. The cargo securing device of claim 20, wherein the first direction is different from the second direction.

22. The cargo securing device of claim 20, wherein engaging the strap with the locking member generally inhibits further movement of the strap in the second direction and fixes the operative length of the strap.

23. The cargo securing device of claim 20, wherein the operative length of the strap is capable of being shortened when the strap is positioned in the first direction.

24. The cargo securing device of claim 20, wherein strap is positionable in a third direction releasing the locking member from engagement with the strap whereby the strap is generally positionable in at least the third direction.

25. The cargo securing device of claim 24, wherein the operative length of the strap is capable of being lengthened when the strap is positioned in the third direction.

26. The cargo securing device of claim 19, further comprising:
- a second body having a second aperture positioned therein, the second end portion of the strap positioned in the second aperture; and
- a second locking member positioned in the second body in operative communication with the second aperture, wherein the strap is capable of being positioned in a fourth direction generally free of engagement with the second locking member and wherein the strap is capable of being positioned in a fifth direction pivoting the second locking member into engagement with the strap fixing a position of the strap relative to the second body.

27. The cargo securing device of claim 26, further comprising at least one first protrusion attached to the locking member and at least one second protrusion attached to the second locking member, wherein the first protrusion engages the strap upon engagement of the locking member with the strap and the second protrusion engages the strap upon engagement of the second locking member with the strap fixing the operative length of the strap.

28. A cargo securing device comprising:
- a strap;
- a body member having an opening, the strap positioned in the opening; and
- a securing mechanism located in the body member, the strap is moveable in a first direction free from engagement with the securing mechanism and the strap is moveable in a second direction engaging the securing mechanism generally securing the strap within the body member and fixing an operative length of the strap;
- wherein the strap is moveable in a third direction whereby the strap is capable of being released from engagement with the securing mechanism and the strap is capable of being lengthened.

* * * * *